May 25, 1954 — W. E. REYNOLDS — 2,679,108
GEAR CUTTER SETTING GAUGE
Filed June 8, 1951

INVENTOR
WILLIAM E. REYNOLDS.
BY Dybvig & Dybvig
His Attorney.

Patented May 25, 1954

2,679,108

UNITED STATES PATENT OFFICE 2,679,108

GEAR CUTTER SETTING GAUGE

William E. Reynolds, Dayton, Ohio

Application June 8, 1951, Serial No. 230,548

3 Claims. (Cl. 33—185)

This invention relates to a gear cutter setting gauge and more particularly to a gauge of the type to be used when cutting gears on a machine that has no cutter setting indicator or when a very accurate gear is required.

There are many machine shops which are not equipped with gear cutting machines but which are called upon to use their milling machines for cutting gear teeth. These shops then utilize a conventional milling machine equipped with a dividing head for cutting gears. One big disadvantage of using milling machines for gear cutting purposes is that they do not have any means for accurately setting the gear cutter centrally with respect to the gear blank holding apparatus.

The present practice in the industry for setting a gear cutter central on a machine that has no cutter setting indicator is to center the cutter by eye and then take a single cut through a test gear blank. Without changing the position of the cutter, the test blank in then removed from the work arbor and turned end for end. The test blank is left loose on the arbor and then with the cutter stopped it is fed into the slot already cut. The cutter is then run just long enough to mark its position in relation to the slot produced by the first cut. If the cutter is exactly central, the second cut will follow the outline of the first cut, but if it is out of center, the cutter will cut some stock from the top of the space on the one side and from the bottom on the other side, indicating that the cutter table should be moved laterally away from the side of the tooth from which stock was removed from the bottom. After moving the table by guess, the above operation is repeated until the cutter is properly centered, after which the test gear blank is removed and replaced by the regular gear blank. The above procedure is not only time consuming but also requires extra good lighting and good eyesight and judgment on the part of the operator.

It is an object of this invention to provide a gauge which will eliminate the need for the above time consuming procedure.

More particularly, it is an object of this invention to provide a gauge which will directly indicate to the operator when the gear cutter is centrally set.

Another object of this invention is to provide a gear cutter setting gauge which is easy to operate and which will give a direct reading indicative of the degree of misalignment, if any, between the gear cutter and the gear blank.

Still another object of this invention is to provide a gauge which may be mounted between the centers of a gear blank holder or support in a manner to engage the gear cutter while the gear cutter is adjusted to the exact central position over the gear blank supporting arbors.

Other objects and advantages reside in the construction of parts, the combination thereof and the mode of operation, as will become more apparent from the following description.

Figure 1:
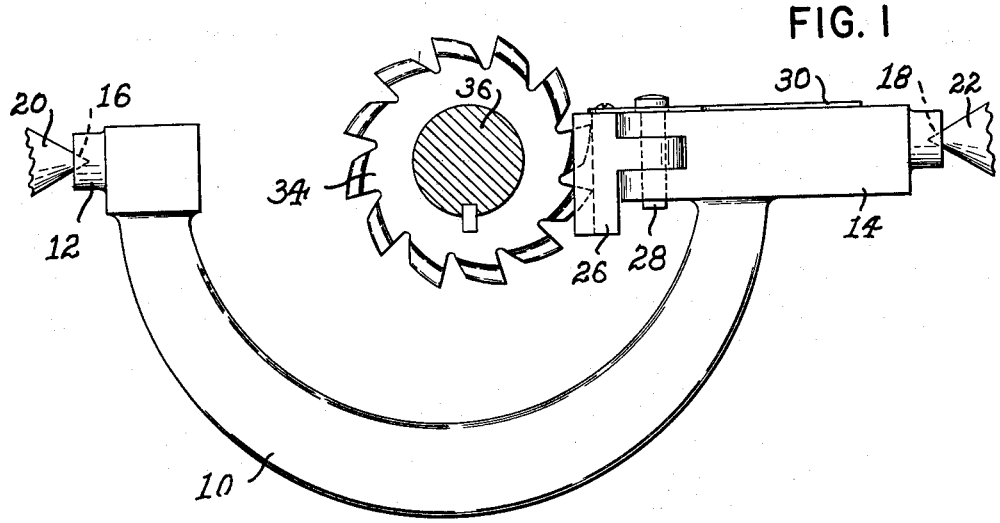
Figure 1 is an elevational view of a gauge embodying my invention showing the gauge mounted between the tailstock and the dividing head of a milling machine.

Referring now to the drawing wherein I have shown a preferred embodiment of my invention, reference numeral 10 generally designates a U-shaped frame member which is provided with integrally formed projections 12 and 14 at the upper ends of the U. The projections 12 and 14 are provided with center bores 16 and 18 respectively for mounting the gauge between the center 20 of the tailstock and the center 22 of the dividing head of a conventional milling machine. Inasmuch as the constructions of the milling machine and the dividing head do not form a part of the gauge and are well known to those skilled in the art, they have not been shown in full in the drawing.

Figure 2:
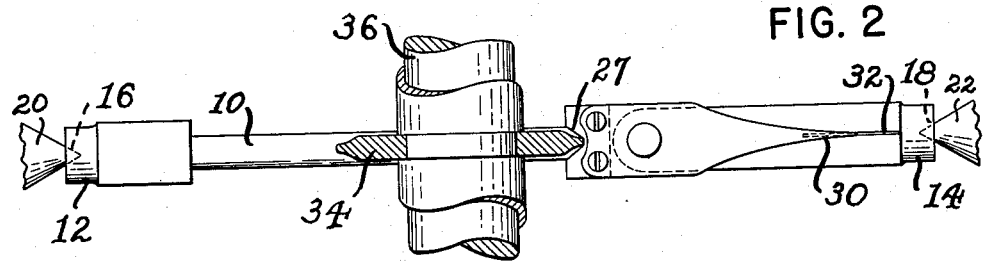
Figure 2 is a plan view of the gauge shown in Figure 1 showing the position of the pointer when the gear cutter has been properly centered.
Figure 3:
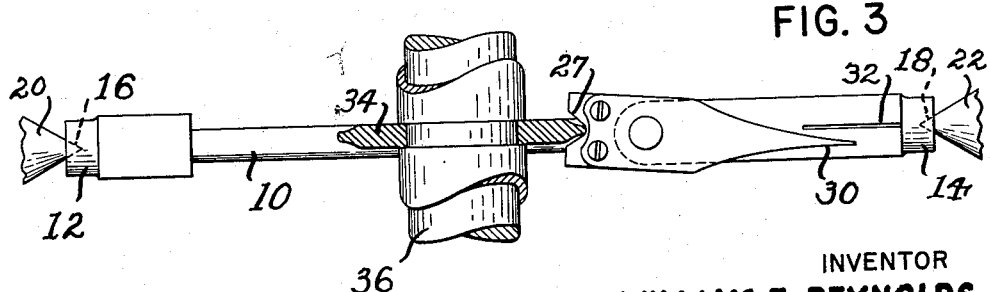
Figure 3 is a view similar to Figure 2 but showing the effect of an improperly centered gear cutter.

When the frame 10 of the gauge is supported between the centers 20 and 22 of the milling machine, a definite relationship or alignment is established between the frame of the gauge and the centers which are to support the gear blank. The frame 10 of the gauge supports a V-block 26 which is pivotally secured to the frame by means of a pin 28, as shown. The block 26 is provided with a substantially V-shaped groove 27 for engaging the teeth of a gear cutter 34 mounted on the arbor 36 of the milling machine. A pointer 30 is secured to the V-block 26 and is arranged to cooperate with a mark or groove 32 provided on the upper end of the frame 10. In setting up the milling machine for cutting gear teeth, the gear cutter 34 is first mounted on the revolving arbor 36 of the milling machine in accordance with standard practice. Thereafter two of the teeth of the gear and the V-block 26 are moved into registry. If the center line of the gear cutter 34 is in alignment with the centers 20 and 22 on the tailstock and divider head respectively, the pointer 30 will line up with the notch or indicator 32 and indicate to the operator that the gear cutter is properly centered. Figure 2 of the drawing shows such a relationship, whereas Figure 3 of the drawing shows what happens if the gear cutter is not central. In order to center the gear cutter, the operator merely makes the necessary relative adjustment between the arbor 36 on which the gear cutter 34 is mounted and the work supporting centers 20 and 22 until the pointer 30 lines up with the marker 32. The gauge is then removed from the centers and the gear blank is substituted therefor.

By virtue of the above construction and arrangement, it is obvious that the gear cutter may be set central very quickly and accurately and that any misalignment is shown up by the pointer 30 which shows the degree of misalignment on a greatly exaggerated scale, so that even a minute amount of misalignment can be detected and corrected.

For purpose of illustrating the invention, I have shown the gauge used in connection with a device for use in cutting gear teeth, whereas the gauge can also be used in centering a saw blade or the like directly over a shaft or other device in which a spline, key seat, or the like is to be cut.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a gauge for use in centering a gear cutter relative to the gear blank supporting centers of a milling machine or the like, the combination, a substantially U-shaped frame member, means on the upper ends of said U-shaped frame member for supporting the same between said centers, means pivotally mounted adjacent one arm of said frame member for engaging said gear cutter, and means on said frame fixedly connected to said pivotally mounted means and cooperating with said one arm of the U-shaped member for indicating the degree of misalignment, if any, between said gear cutter and said centers.

2. A gauge for use in centering a gear cutter relative to the gear blank supporting centers of a milling machine or the like, comprising in combination, a substantially U-shaped frame member, means on the upper ends of said U-shaped frame member for supporting the same between said centers, means pivotally mounted adjacent one arm of said frame member for engaging said gear cutter, and means on said frame fixedly connected to said pivotally mounted means and cooperating with said one arm of the U-shaped member for indicating the degree of misalignment, if any, between said gear cutter and said centers, said means for engaging said gear cutter having a substantially V-shaped groove adapted to engage the teeth on said gear cutter.

3. A gauge for use in centering a gear cutter relative to the gear blank supporting centers of a milling machine or the like, comprising in combination, a substantially U-shaped frame member, means on the upper ends of said U-shaped frame member for supporting the same between said centers, means pivotally mounted adjacent one arm of said frame member for engaging said gear cutter, and means for indicating the degree of misalignment, if any, between said gear cutter and said centers, said last named means comprising a pointer carried on the means for engaging the gear cutter and an indicator provided on the upper end of said one arm of said U-shaped frame member.

References Cited in the file of this patent

UNITED STATES PATENTS

| Number | Name | Date |
|---|---|---|
| 1,422,746 | Couse | July 1, 1922 |
| 1,794,162 | Flamm | Feb. 24, 1931 |
| 2,472,241 | Wilson | June 7, 1949 |
| 2,547,683 | Blesi | Apr. 3, 1951 |
| 2,621,420 | Brelsford | Dec. 16, 1952 |